United States Patent [19]
Nojima et al.

[11] Patent Number: 5,841,261
[45] Date of Patent: Nov. 24, 1998

[54] SYSTEM FOR CONTROLLING STEPPING MOTOR FOR DIVIDING A SINGLE STEP OF THE MOTOR INTO PLURAL SECTIONS AND APPLYING VOLTAGES WHOSE LEVELS ARE DETERMINED IN ACCORDANCE WITH THE SECTIONS

[75] Inventors: Takashi Nojima, Mitaka; Soichi Hiramatsu, Hachioji; Hideki Yamaguchi; Hiroyuki Inoue, both of Yokohama; Hitoshi Nakamura, Kawasaki; Akira Kida, Yokohama; Hideaki Kawakami, Yokohama; Takeshi Iwasaki, Yokohama, all of Japan

[73] Assignee: Canon Kabushiki Kaisha, Tokyo, Japan

[21] Appl. No.: 552,389

[22] Filed: Nov. 3, 1995

[30] Foreign Application Priority Data

Nov. 10, 1994 [JP] Japan .................................. 6-301360

[51] Int. Cl.$^6$ ................................................. H02P 8/00
[52] U.S. Cl. .......................... 318/696; 318/254; 318/439; 318/138

[58] Field of Search ..................................... 318/685, 696, 318/254, 439, 138

[56] References Cited

U.S. PATENT DOCUMENTS

| | | | |
|---|---|---|---|
| 3,885,210 | 5/1975 | Burnett | 318/696 |
| 4,121,145 | 10/1978 | Talmadge | 318/696 |
| 4,490,664 | 12/1984 | Moriguchi | 318/696 |
| 4,697,129 | 9/1987 | Enami et al. | 318/685 X |
| 4,757,247 | 7/1988 | Ranger | 318/696 |
| 5,150,030 | 9/1992 | Ito et al. . | |
| 5,216,345 | 6/1993 | Everly | 318/696 |

*Primary Examiner*—Jonathan Wysocki
*Attorney, Agent, or Firm*—Fitzpatrick, Cella, Harper & Scinto

[57] ABSTRACT

A system for smoothly driving a stepping motor with constant currents. For that purpose, a voltage level setting circuit forms various combinations of voltage levels for a first phase and voltage levels for a second phase. Drive currents of the stepping motor are determined using the various combinations for a plurality of times during one step drive of the stepping motor.

10 Claims, 7 Drawing Sheets

| TRANSISTORS | | OUTPUT RATIO |
|---|---|---|
| 5 | 6 | |
| OFF | OFF | 4 |
| OFF | ON | 3 |
| ON | OFF | 2 |
| ON | ON | 1 |

FIG.3

| S$_1$ | S$_2$ | 5 | 6 | 7 | 8 | VOLTAGE LEVEL PHASE A | VOLTAGE LEVEL PHASE B |
|---|---|---|---|---|---|---|---|
| ON | ON | OFF | OFF | ON | ON | 4 | 1 |
| OFF | ON | OFF | ON | OFF | ON | 3 | 2 |
| ON | OFF | ON | OFF | ON | OFF | 2 | 3 |
| OFF | OFF | ON | ON | OFF | OFF | 1 | 4 |

| S₁ | S₂ | 5 | 6 | 7 | 8 | VOLTAGE LEVEL PHASE A | VOLTAGE LEVEL PHASE B |
|---|---|---|---|---|---|---|---|
| ON | ON | OFF | OFF | ON | ON | 4 | 1 |
| OFF | ON | OFF | ON | ON | OFF | 3 | 2 |
| ON | OFF | ON | OFF | OFF | ON | 2 | 3 |
| OFF | OFF | ON | ON | OFF | OFF | 1 | 4 |

SYSTEM FOR CONTROLLING STEPPING MOTOR FOR DIVIDING A SINGLE STEP OF THE MOTOR INTO PLURAL SECTIONS AND APPLYING VOLTAGES WHOSE LEVELS ARE DETERMINED IN ACCORDANCE WITH THE SECTIONS

BACKGROUND OF THE INVENTION

1. Field of the Invention

The present invention relates to a drive control system for a stepping motor, and more particularly to a drive control system for a stepping motor, which permits smooth driving according to each in a plurality of operation modes.

2. Related Background Art

Since stepping motors are excellent in rotational positioning accuracy, they have been widely used as a drive source for industrial devices. As a result, they are often used as a driving motor for business machines for office use, i.e., so-called OA (office automation) devices.

A typical example of the drive method for such stepping motors is a constant-voltage drive. Since this method has the simplest circuit setup and is lowest in cost, it has been widely used heretofore. There is, however, a problem that with an increase in drive frequency, the rise in the current becomes diminished in motor windings because of the influence of the inductance of the motor windings, so as to cause a decrease in torque at high-speed rotation, thereby preventing high-speed rotation.

Constant-current drive is known as a drive method to permit high-speed rotation. This method is a drive method employing the setup of voltage and winding inductance with a small time constant of the motor windings, in which a voltage signal detected from a fine resistor element arranged in series with the motor winding is compared with a predetermined reference voltage, a switch is turned off when a voltage signal proportional to the current exceeds the set value, and the switch is turned on when the current is below the set value during application of drive pulses, thereby controlling the current at a constant level. The constant-current method is popularly used, and constant-current chips, which are dedicated ICs, are commercially available.

Figure 9:
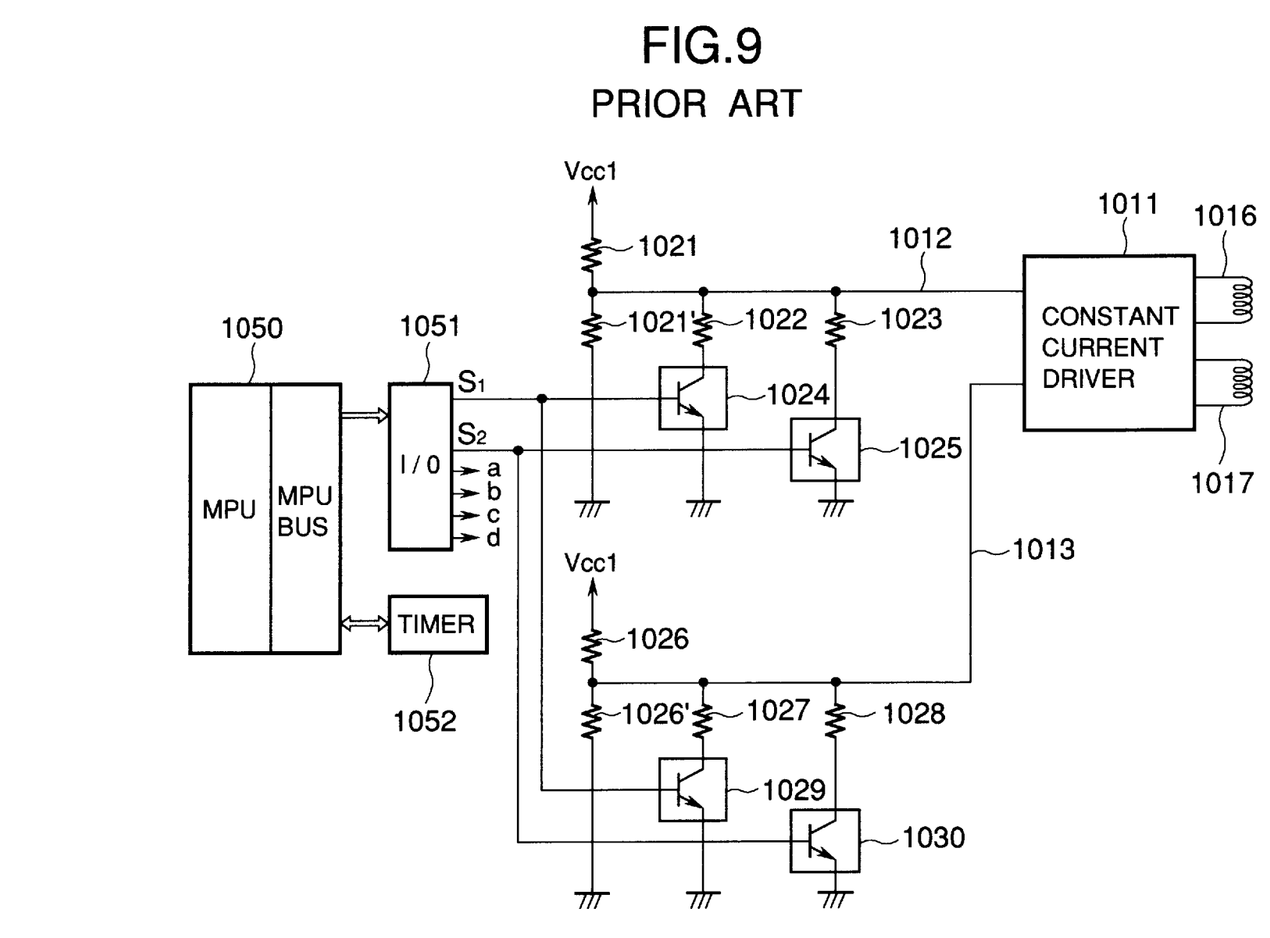
FIG. 9 is a circuit block diagram of a motor control apparatus as a conventional example.

FIG. 9 is a drawing to show a conventional example of a chopping drive circuit for a constant-current motor. In FIG. 9, reference numeral 1011 is a constant-current driver, on the input side of which there are a level input terminal 1012 for phase A and a level input terminal 1013 for phase B. Phase A 1016 and phase B 1017 of a stepping motor are connected to the output side of the driver. In the constant-current driver 1011, a voltage applied to each level input terminal thereof is chopped to attain a current value proportional to the voltage for each phase of the motor, thereby achieving such control that a constant current flows in each of the windings of the motor.

Level setting for phase A is performed for the phase-A level input 1012. For setting the level of phase A, a circuit for changing the level voltage at the phase-A level input (voltage level setting circuit) is composed of four voltage-dividing resistors 1021, 1021', 1022, 1023 for dividing a power-supply voltage and two transistors 1024, 1025 acting as on/off switches, and the constant power-supply voltage input into this circuit is converted into either one of level output voltages (appearing on the phase-A level input 1012) depending upon on or off states of the two transistors. Describing this feature in further detail, the resistor 1022 connected to the collector of the transistor 1024, and (or) the resistor 1023 connected to the collector of the transistor 1025, determine the level output voltage, depending upon the on or off states of the respective transistors, while acting as a voltage-dividing resistor (when the transistor is on) or not acting as a voltage-dividing resistor (when the transistor is off). Two output ports (S1, S2) are assigned to I/O (input/output interface) 1051 connected to MPU 1050, and the output ports S1, S2 are connected to the transistors 1024, 1025, respectively. When the transistors 1024, 1025 each are switched on or off depending upon a combination of on (High) and/or off (Low) of the output ports S1, S2, the level output voltage is changed, thereby setting the current so as to be proportional to the level output voltage from the constant-current driver 1011. The current thus set is supplied to phase A of the motor.

The same voltage level setting circuit as that for phase A is provided for the level setting of phase B. Similar to the voltage level setting circuit for phase A, the voltage level setting circuit for phase B is composed of four resistors 1026, 1026', 1027, 1028 and two transistors 1029, 1030. This circuit also changes the level voltage for the phase-B level input 1013 of the constant-current driver 1011 in the same manner, and the constant-current driver 1011 sets a current proportional to the level voltage and supplies it to phase B of motor.

The resistance value of the resistor 1022 is set to be greater than that of resistor 1023, the resistors 1022 and 1027 are set to the same resistance value, and the resistors 1023 and 1030 are set to the same resistance value.

In the circuit setup as described above, setting of a first current value for phase A and phase B is achieved when the output port S1 is on and the output port S2 is off. In this case, the transistors 1024 and 1029 become on while the transistors 1025 and 1030 become off. Then the same current value is set for phase A and phase B.

Further, setting of a second current value is achieved when the output port S1 is off and the output port S2 is on. In this case, the transistors 1024 and 1029 turn off while the transistors 1025 and 1630 turn on. Then the same current value is set for phase A and phase B.

Further, setting of a third current value is achieved when the output port S1 is on and the output port S2 is on. In this case, all transistors 1024, 1029, 1025, 1030 become on. Then the same current value is set for phase A and phase B.

Setting of a fourth current value is achieved when the output port S1 is off and the output port S2 is off. In this case, all transistors 1024, 1029, 1025, 1030 become off. Then the same current value is set for phase A and phase B.

The current values thus set are arranged as follows in order from the highest: the fourth setting, the first setting, the second setting, and the third setting. The motor is driven by switching the currents thus set depending upon the drive mode of the motor.

The number of voltage levels that can be set can be increased by adding resistors the setting of the voltage level used in the voltage level setting circuit in parallel as described above, which permits fine control, but which makes the voltage level setting circuit complex and which increases the number of output ports of the I/O interface for the MPU, thus increasing the cost.

Further, switching of excitation is digitally performed in the constant-voltage control for applying a constant voltage to the windings of the motor, the constant-current control for letting a current set for each winding flow therein, as described above, or in closed-loop control, and thus, waveforms of the currents applied to the windings of the motor become nearly rectangular, raising the drawback of easily causing vibration or noise.

Thus, an attempt has been made to change the amplitudes of the phase currents from the rectangular waveforms of the currents applied to the windings of the motor, for example, to a method for applying currents in a sinusoidal form. Specifically, there has been proposed such a driving method of stepping motor that a pulse generating means is arranged which is capable of setting the duty by the firmware for controlling the power supplied to the windings of the motor, the pulse generating means dividing the duration for one excitation the motor into a preset division number of sections so as to preliminarily set the supplied amount of power to the windings of the motor, that is, the duty pulse, by a program in the firmware, and thus, motor control is carried out by an open loop to supply the power necessary only for the operation of the motor, thereby efficiently driving the stepping motor. Further, another driving method of for driving stepping a motor has also been proposed in such an arrangement that the above method is used to divide the duration of one excitation into a preset division number of sections, the power supply amount to the windings, that is, the duty pulse, is set to a nearly sinusoidal form, and the duty pulse is changed for each mode of stop, hold, ramp up-down, or constant-speed drive.

This method requires a pulse generating means and causes a great load on the firmware. For example, when the method is used for a printer of an OA device, a drop of in the recording speed becomes great and the region of the ROM for storing the firmware becomes large. Thus, it has drawbacks with respect to performance and cost.

Another example of a sophisticated drive method is a control method in which an encoder, with accuracy above the resolution of the motor, is attached to a shaft of the motor, and the phases are changed over in synchronization with motion of the motor according to information from the encoder, so as to chop the voltage or the current, and thereby the rotation speed is changed by the duty cycle. According to this method, appropriate phase changeover can be performed even with a change in the number of revolutions of the motor, which can avoid a so-called out-of-step state of the motor and which can suppress the generation of noise because the rotation frequency comes to match the power to the windings. However, the number of constituent components of the circuit setup becomes a maximum including the encoder of the motor, thus increasing the cost of the setup.

SUMMARY OF THE INVENTION

An object of the present invention is to overcome the above drawbacks and thereby to achieve smooth driving of a stepping motor from the low-speed range to the high-speed range by dividing the duration of one step drive of a stepping motor into a plurality of sections by an inexpensive setup.

Another object of the present invention is to smooth waveforms of drive currents of the stepping motor by changing over comparison resistances of a constant-voltage circuit.

The other objects of the present invention will become apparent by specific embodiments as described below.

DESCRIPTION OF THE PREFERRED EMBODIMENTS

The embodiments of the present invention will be explained.

(Embodiment 1)

Figure 1:
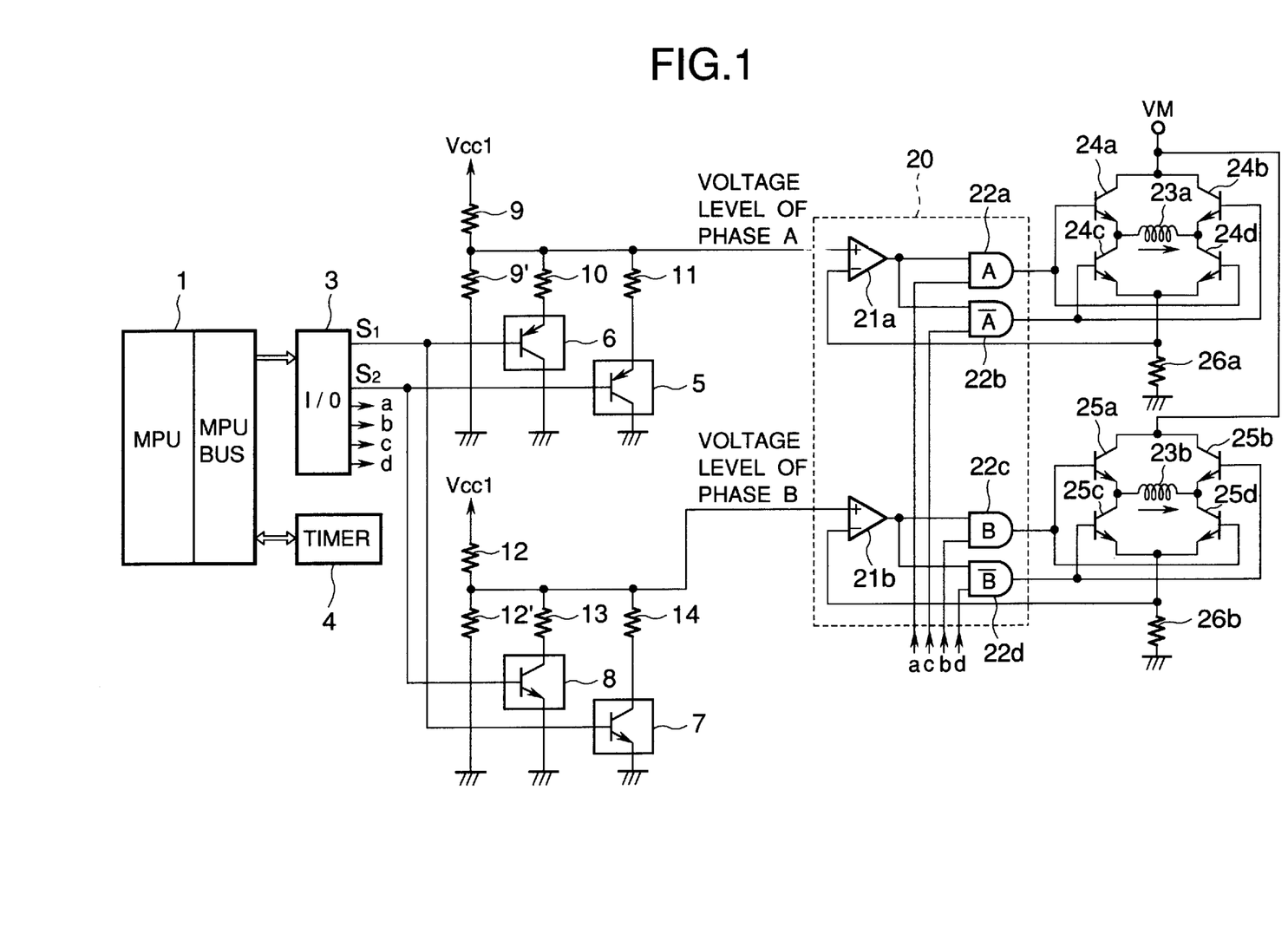
FIG. 1 is a circuit block diagram of a motor control apparatus in Embodiment 1 of the present invention.

FIG. 1 is a circuit block diagram of the motor control apparatus in Embodiment 1 of the present invention. In FIG. 1, reference numeral 1 designates an MPU for executing motor drive control, and 3 I/O ports connected to an MPU bus of MPU 1. These I/O ports 3 generate coded signals for drive of the stepping motor. Numeral 4 denotes a programmable timer connected to the MPU bus of MPU 1. The I/O ports are provided with output ports S1, S2 for setting voltage levels. The output port S1 is connected to transistors 6, 7, and the output port S2 is connected to transistors 5, 8. Further, the I/O ports 3 output control signals a, b, c, d, depending upon step drive timing of the timer 4.

Two sets are provided as a voltage level setting circuit for phase A and a voltage level setting circuit for phase B, whose voltage levels are set by switching the transistors 5, 6, 7, 8 acting as on/off switches. Resistors in the voltage level setting circuits are resistors 9, 9', 10, 11 for phase A and 12, 12', 13, 14 for phase B. Resistance values in the voltage level setting circuits are determined so that resistor 9=resistor 12, resistor 9'=resistor 12', resistor 10=resistor 14, and resistor 11=resistor 13. Here, the all transistors are assumed to show the same saturation.

Figure 2:
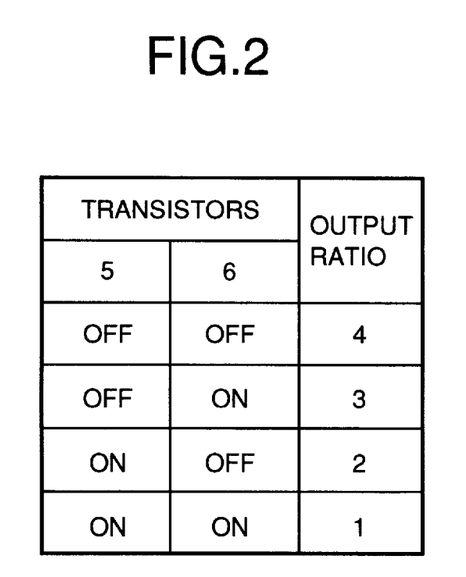
FIG. 2 is a table for illustrating magnitudes of setting outputs in Embodiment 1.

For convenience' sake of explanation, let us here assume that the resistances of resistors 9, 9', 10, 11 are determined so that the ratio of output voltages becomes 1:2:3:4 by combinations of on and/or off states of transistors 5, 6 in the voltage level setting circuit for phase A, as shown in the table of FIG. 2. Although not shown, the resistances of resistors 12, 12', 13, 14 are also determined so that the ratio of output voltages becomes 1:2:3:4 by combinations of on and/or off states of transistors 7, 8 in the voltage level setting circuit for phase B in the same manner as for phase A.

Outputs from the voltage level setting circuits are input into a constant-current drive circuit 20, and outputs therefrom are supplied to bipolar transistors 24a, 24b, 24c, 24d or 25a, 25b, 25c, 25d. A sensor resistor 26a or 26b is connected between these transistors 24c, 24d or 25c, 25d, respectively, and the earth.

The constant-current drive circuit 20 has comparators 21a, 21b and AND gates 22a, 22b, 22c, 22d. The comparators 21a, 21b compare voltages input into a non-inverting terminal and an inverting terminal with each other. If the input voltage to the non-inverting terminal is higher than that to the inverting terminal, the comparator outputs an H (High) signal; on the other hand, if the input voltage to the non-inverting terminal is lower than that to the inverting terminal, the comparator outputs an L (Low) signal.

An output from the comparator 21a is input into one input terminal of each AND gate 22a, 22b, and the control signal a or c is input into the other input terminal of the AND gate 22a or 22b, respectively. The output from the comparator 21b is input into one input terminal of each AND gate 22c, 22d, and the control signal b or d is input into the other input terminal of the AND gate 22c or 22d, respectively.

Further, the output from the AND gate 22a is supplied to the transistors 24a, 24d, and the output from the AND gate 22b to the transistors 24b, 24c. The output from the AND gate 22c is supplied to the transistors 25a, 25d, and the output from the AND gate 22d is supplied to the transistors 25b, 25c.

As described, the constant-current drive circuit 20 is a circuit which function to supply a current determined by an input voltage thereto to a motor winding 23a, 23b, which is arranged in such a manner that the comparator 21a, 21b compares the output voltage from the voltage level setting circuit, input into the non-inverting terminal of the comparator, with the voltage determined by a current value flowing in the sensor resistor 26a, 26b, which is an input voltage to the inverting terminal of the comparator, and a constant current, determined by the input voltage value, is supplied to the motor winding 23a, 23b by decreasing the current when a higher current flows in the motor winding 23a, 23b or increasing the current when a lower current flows therein. Since the current value is determined by the input voltage value in this manner, the current value changes with a change in the input voltage value.

Figure 3:
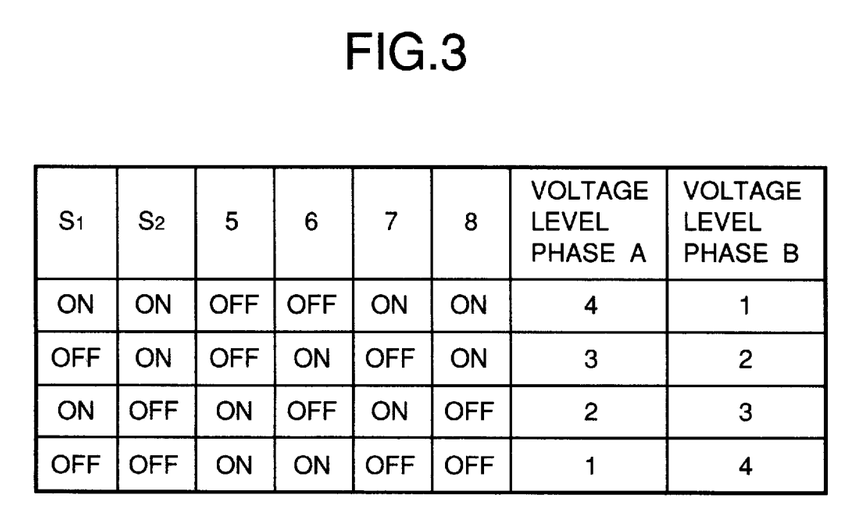
FIG. 3 is a table for illustrating voltage levels of phase A and phase B obtained according to combinations of on and/or off outputs from I/O ports and combinations of on and/or off states of transistors in Embodiment 1.

The table of FIG. 3 shows setting voltage levels for phase A and phase B in connection with on and/or off states of the transistors 5, 6, 7, 8 depending upon the on and/or off states of the output ports S1, S2 in the circuit of FIG. 1.

Figure 4:
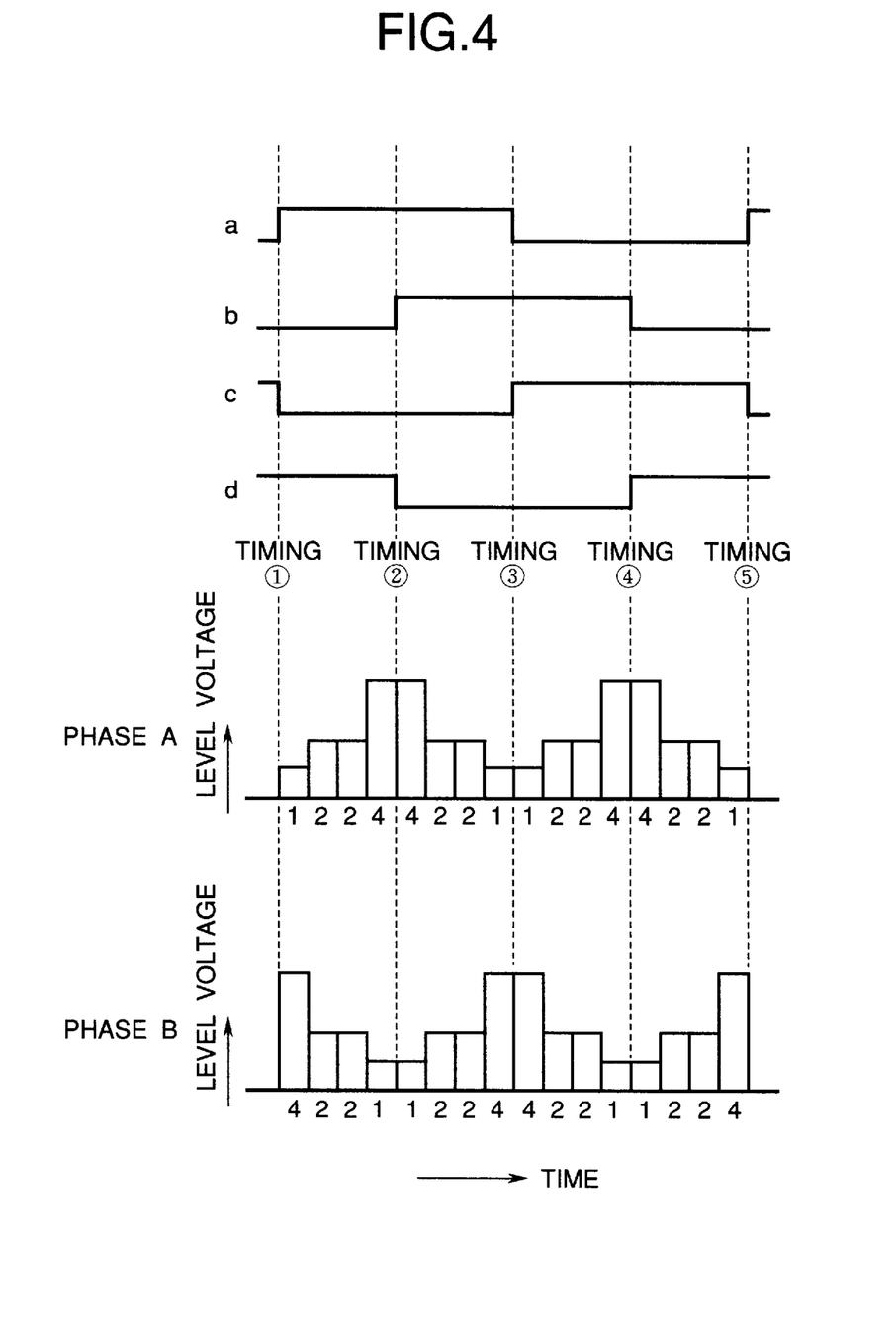
FIG. 4 is a graph to show time changes of the level voltages of phase A and phase B in Embodiment 1.

The output ports S1, S2 are switched four times within a duration of one step drive. This is shown in FIG. 4. In FIG. 4, the control signals a, d are at the high level at the initial step drive timing (the first timing) from the timer 4. At a next step drive timing (the second timing) from the timer 4, the control signal d assumes the low level, the control signal b assumes the high level, and the control signal a is kept at the high level. At a next step drive timing (the third timing) from the timer 4, the control signal a assumes the low level, the control signal c assumes the high level, and the control signal b is kept at the high level. At a next step drive timing (the fourth timing) from the timer 4, the control signal b assumes the low level, the control signal d assumes the high level, and the control signal c is kept at the high level. At a next step drive timing (the fifth timing) from the timer 4, the control signal b assumes the low level, the control signal d assumes the high level, and the control signal a is kept at the high level, thus returning to the state of the initial step drive timing.

This operation will be called "within one step drive," because the step motor is driven by one step between the generation of a certain step drive timing by the timer 4 and generation of the next step drive timing by the timer 4, as described above.

The operation of the above setup is next explained referring to FIG. 3 and FIG. 4.

As described above, each output port S1, S2 is switched four times within a time duration of each step drive, and thus, is naturally switched four times also within the time duration of one step drive between the generation of the first step drive timing (the first timing) and generation of the next step drive timing by the timer 4.

During an initial quarter pulse after generation of the initial step drive timing (the first timing), S1 is off and S2 is off.

In this case, as apparent from the table of FIG. 3, the level output of phase A (setting voltage level) is 1 and the level output of phase B is 4. Thus, 1 of the phase-A voltage level is input into the non-inverting terminal of the comparator 21a, and 4 of the phase-B voltage level is input into the non-inverting terminal of the comparator 21b. The each comparator 21a, 21b compares the voltages input into the non-inverting terminal and the inverting terminal with each other. If the input voltage to the non-inverting terminal is higher than that to the inverting terminal, the comparator supplies H (High) output. The high level output is supplied to the AND gates 22a, 22b or 22c, 22d. Since on this occasion the control signals a, d from the I/O ports 3 are at the high level, the AND gates 22a and 22d yield AND, which turns the transistors 24a, 24d on and the transistors 25b, 25c on. Thus, a current flows in the, direction of the arrow in the motor winding 23a and a current flows in the reverse direction to the arrow direction in the motor winding 23b. When the current flows in the motor winding 23a, 23b, the current also flows in the sensor resistor 26a, 26b. A voltage determined by the current flowing in the sensor resistor 26a, 26b is input to the inverting terminal of comparator 21a, 21b, and the comparator 21a, 21b compares the voltage input to the inverting terminal with the input voltage to the non-inverting terminal. If the input voltage to the non-inverting terminal is lower than that to the inverting terminal, the comparator supplies an L (Low) output. This does not permit the AND gate 22a and 22d to yield AND, so that the current is momentarily stopped to the motor winding 23a, 23b. With a decrease in the current flowing in the sensor resistor 26a, 26b, the comparator 21a, 21b instantaneously comes to supply the H (High) output, which allows the AND gate 22a, 22d to yield AND, thereby causing the current to flow in the motor winding 23a, 23b. As described above, the constant-current drive circuit 20 is arranged in such a manner that the comparator 21a, 21b compares the output voltage from the voltage level setting circuit, input into the non-inverting terminal of the comparator, with the voltage determined by the current flowing in the sensor resistor 26a, 26b, which is the input voltage to the inverting terminal of the comparator, and the constant current determined by the input voltage value (1 for the phase-A voltage level or 4 for the phase-B voltage level) is caused to flow in the motor winding 23a, 23b by decreasing the current when a higher current flows in the motor winding 23a, 23b or by increasing the current when a lower current flows therein.

In a next quarter pulse, S1 is on and S2 is off. In this case, as is apparent from the table of FIG. 3, the level output of phase A is 2 and the level output of phase B is 2. Thus, 2 of the phase-A voltage level is input into the non-inverting terminal of the comparator 21a, and 2 of the phase-B voltage level is input into the non-inverting terminal of the comparator 21b. On this occasion, the constant-current drive circuit 20 also operates in the same manner as in the initial quarter pulse, so as to supply a constant current determined by the input voltage value (2 for the phase-A voltage level or 2 for the phase-B voltage level) to the motor winding 23a, 23b.

Further, in a next quarter pulse, S1 and S2 are kept in the same state as the previous state.

In a final quarter pulse, S1 is on and S2 is on. On this occasion, as is apparent from the table of FIG. 3, the level output of phase A is 4 and the level output of phase B is 1. Thus, 4 of the phase-A voltage level is input into the non-inverting terminal of the comparator 21a, and 1 of the phase-B voltage level is input into the non-inverting terminal of the comparator 21b. In this case, the constant-current drive circuit 20 also operates in the same manner as in the initial quarter pulse, so as to supply a constant current determined by the input voltage value (4 for the phase-A voltage level or 1 for the phase-B voltage level) to the motor winding 23a, 23b.

Also within a duration of one step drive from the next step drive timing (the second timing) to generation of the further next step drive timing (the third timing) by the timer 4, the output ports S1, S2 each are switched four times. In an initial quarter pulse, S1 and S2 both are on, as in the final quarter pulse in the initial step drive as described above. Accordingly, as is apparent from the table of FIG. 3, the level output of phase A is 4 and the level output of phase B is 1. Thus, 4 of the phase-A voltage level is input into the non-inverting terminal of the comparator 21a, and 1 of the phase-B voltage level is input into the non-inverting terminal of the comparator 21b. In this case, the control signals a, b from the I/O ports 3 are at the high level instead of the control signals a, d. Thus, the AND gates 22a, 22c yield AND, which turns the transistors 24a, 24d on and the transistors 25a, 25d on. As a result, a current flows in the arrow direction of the arrow in the motor winding 23a, and a current flows in the arrow direction in the motor winding 23b. The current also flows in the sensor resistor 26a, 26b, and the constant-current drive circuit 20 supplies the constant current determined by the input voltage value (4 for the phase-A voltage level or 1 for the phase-B voltage level) to the motor winding 23a, 23b, as described above.

In a next quarter pulse of the second step drive timing, S1 is on and S2 is off. On this occasion, as apparent from the table of FIG. 3, the level output of phase A is 2 and the level output of phase B is 2. The constant-current drive circuit 20 thus supplies a constant current determined by the input voltage value (2 for the phase-A voltage level or 2 for the phase-B voltage level) to the motor winding 23a, 23b.

In a further next quarter pulse of the second step drive timing, S1 and S2 are kept in the same state as the previous state.

In a final quarter pulse of the second step drive timing, S1 is off and S2 is off. On this occasion, as is apparent from the table of FIG. 3, the level output of phase A is 1 and the level output of phase B is 4.

The constant-current drive circuit 20 supplies a constant current determined by the input voltage value (1 for the phase-A voltage level or 4 for the phase-B voltage level) to the motor winding 23a, 23b.

In the subsequent operation the output ports S1, S2 return to the initial state and the above operation is repeated. However, since the control signals from the I/O ports 3 are changed at the third step drive timing, the control signals b, c are at the high level instead of the control signals a, b. Subsequently, the control signals c, d assume the high level at the fourth step drive timing and the control signals a, d at the fifth step drive timing, thus returning to the initial state.

Figure 5:
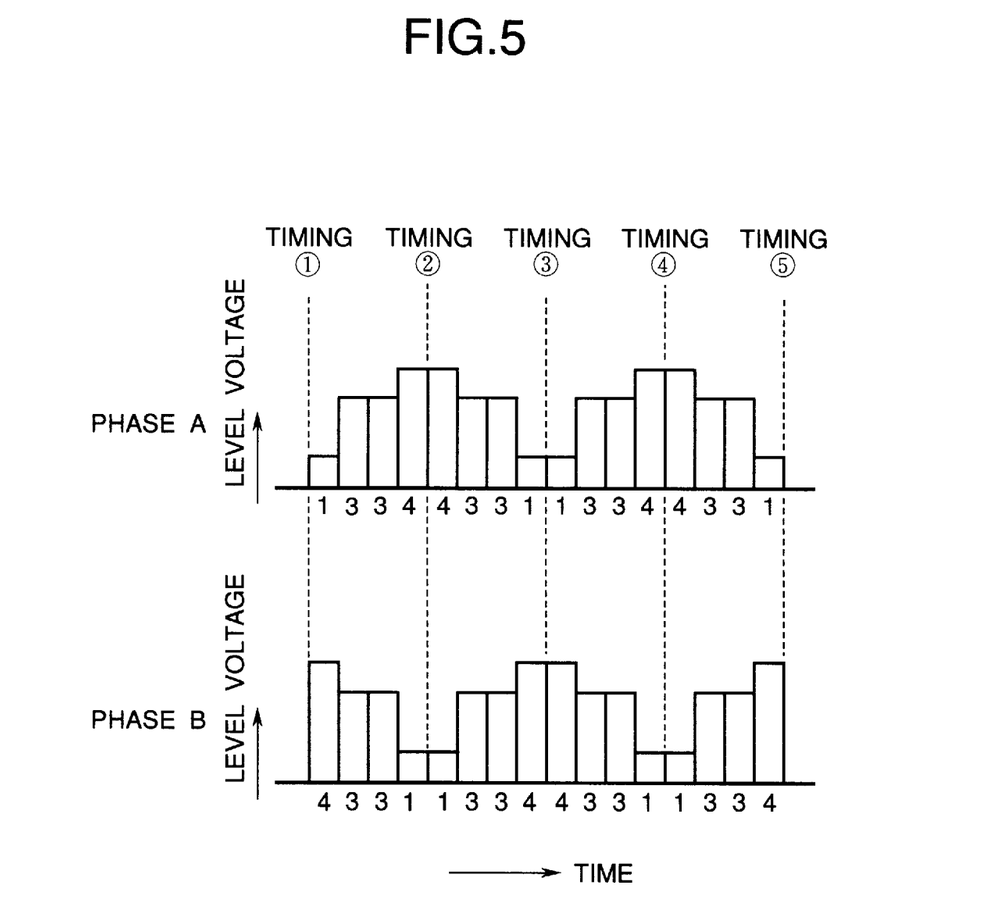
FIG. 5 is a graph to show time changes of the level voltages of phase A and phase B in Embodiment 1.

Next, FIG. 5 shows another example in which the voltage level setting circuit sets other voltage levels. In an initial quarter pulse, S1 is off and S2 is off. Thus, the level output of phase A is 1 and the level output of phase B is 4. In a next quarter pulse, S1 is off and S2 is on. Thus the level output of phase A is 3 and the level output of phase B is 3. In a next quarter pulse, S1 and S2 are kept in the same state as the previous state. Accordingly, the level outputs are also the same. In a final quarter pulse, S1 is on and S2 is on. Thus, the level output of phase A is 4 and the level output of phase B is 1.

If the motor is preliminarily programmed so as to select either one of the drive methods of FIG. 4 and FIG. 5, depending upon the magnitude of necessary torque, surplus torque can be decreased and the driving sound becomes quieter.

Combining chopping of currents in the motor windings (coils) by the above level voltages with phase switching by a known phase switching means, the currents flowing in the motor coils will have waveforms close to sine waves.
(Embodiment 2)

Figure 6:
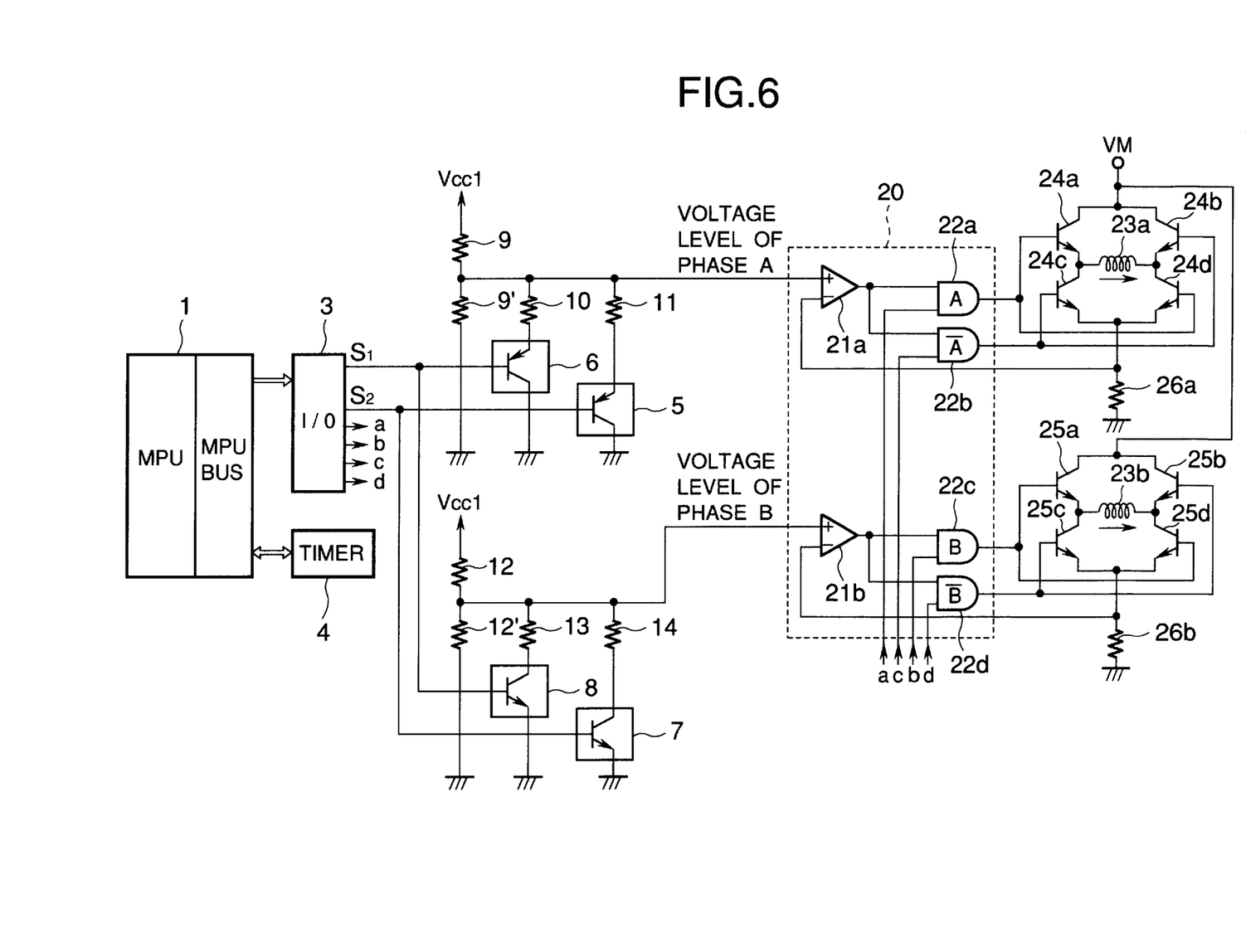
FIG. 6 is a circuit block diagram of another motor control apparatus in Embodiment 2 of the present invention.
Figure 7:
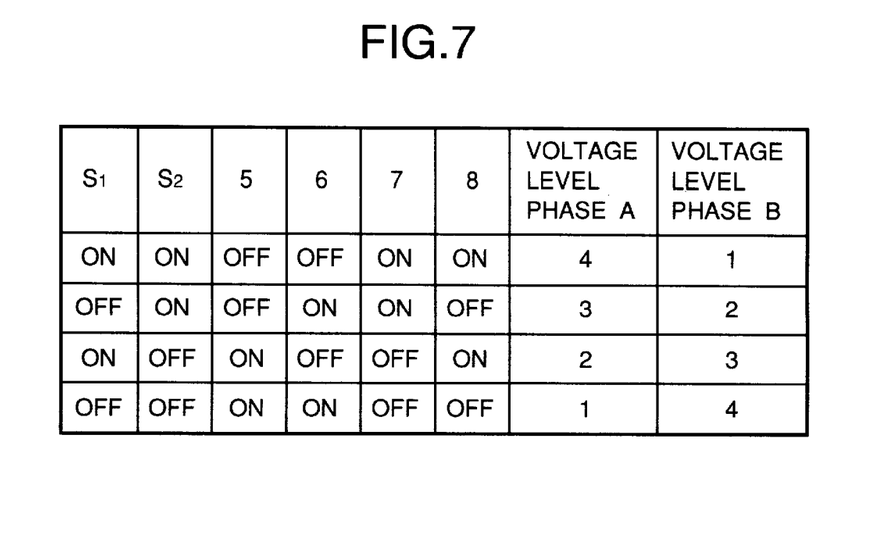
FIG. 7 is a table for illustrating voltage levels of phase A and phase B obtained according to combinations of on and/or off outputs from I/O ports and combinations of on and/or off states of transistors in Embodiment 2.

FIG. 6 is a circuit block diagram of the motor control apparatus in Embodiment 2 of the present invention. Resistance values of the respective resistors are determined to be the same as those in Embodiment 1. The circuit in Embodiment 2 is different in connection of with the output ports S1, S2 to the transistors 5, 6, 7, 8 from the circuit in Embodiment 1. In detail, S1 is connected to the transistors 6, 8 and S2 is connected to the transistors 5, 7. FIG. 7 shows setting voltage levels for phase A and phase B in connection with a relation of the on and/or off states of the transistors 5, 6, 7, 8 with the on and/or off states of S1 and S2.

Figure 8:
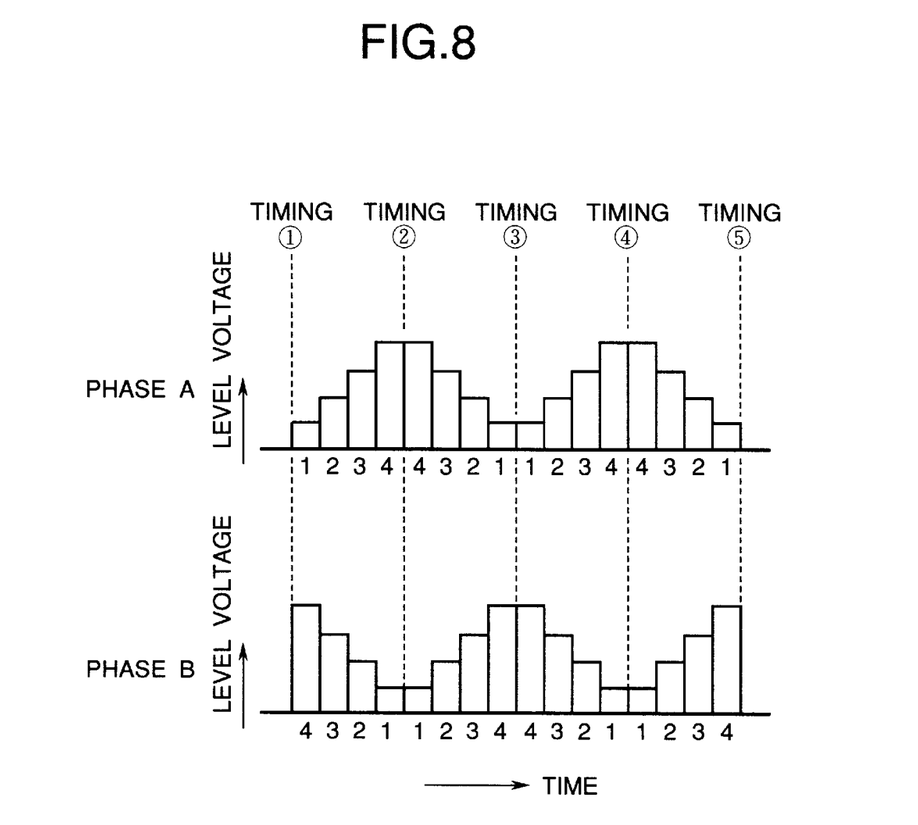
FIG. 8 is a graph to show time changes of the level voltages of phase A and phase B in Embodiment 2.

S1, S2 each are switched four times within one pulse duration. It is shown in FIG. 8. In an initial quarter pulse, S1 is off and S2 is off. Thus, the level output of phase A is 1 and the level output of phase B is 4. In a next quarter pulse, S1 is on and S2 is off. Thus, the level output of phase A is 2 and the level output of phase B is 3. In a next quarter pulse, S1 is off and S2 is on. Thus, the level output of phase A is 3 and the level output of phase B is 2. In a final quarter pulse, S1 is on and S2 is on. Thus, the level output of phase A is 4 and the level output of phase B is 1.

Combining the chopping of currents in the motor windings (coils) by the above level voltages with phase switching by a known phase switching means, the currents flowing in the motor coils will have waveforms close to sine waves.

As detailed above, the present invention provides an inexpensive circuit setup arranged to divide a duration of one excitation phase into a plurality of sections to change over the comparison resistances of the constant-voltage circuit, which achieves smooth current waveforms from the low-speed range to the high-speed range without greatly increasing a load on the firmware, thereby improving the vibration and noise of motor.

What is claimed is:

1. A system for controlling a stepping motor, comprising:
a stepping motor;
drive means for driving said stepping motor, said drive means receiving a step drive signal for changing the excitation phase of said stepping motor and to determine a drive current of said stepping motor in accordance with an input voltage input thereto;
step drive signal generating means for supplying the step drive signal to said drive means to step-drive said stepping motor;
signal generation means for generating a plurality of control signals in a range of a single step driving of said stepping motor; and
level setting voltage generating means for dividing said single step driving range of said stepping motor into a plurality of sections in accordance with the plurality of control signals generated by said signal generation means and for supplying voltages whose levels are determined in accordance with said divided sections to said drive means.

2. A system according to claim 1, wherein the plurality of control signals generated by said signal generation means includes two control signals and said level voltage generation means generates four sets of voltages in response to different combinations of the two control signals.

3. A system according to claim 2, wherein the first of the four sets of voltages comprises a first voltage level for a first phase of the motor and a second voltage level for a second phase of the motor which is less than the first voltage level, wherein the second of the four sets of voltages comprises the second voltage level for the first phase and the first voltage level for the second phase, wherein the third of the four sets of voltages comprises a third voltage level for the first phase and a fourth voltage level for the second phase which is less than the third voltage level, and wherein the fourth of the four sets of voltages comprises the fourth voltage level for the first phase and the third voltage level for the second phase.

4. A system according to claim 3, wherein the first voltage level for the first phase in said first of the four sets of voltages is set greater than the third voltage level for the first phase in the third of the four sets of voltages and the second voltage level for the second phase in said first of the four sets of voltages is set smaller than the fourth voltage level for the second phase in the third of the four sets of voltages.

5. A system according to claim 4, further comprising means for switching the setting of the four sets of voltages in the following order: the first of the four sets of voltages, the third of the four sets of voltages, the fourth of the four sets of voltages, the second of the four sets of voltages, the second of the four sets of voltages, the fourth of the four sets of voltages, the third of the four sets of voltages, and the first of the four sets of voltages.

6. A system according to claim 2, wherein the first of the four sets of voltages comprises a first voltage level for a first phase of the motor and a second voltage level for a second phase of the motor which is less than the first voltage, wherein the second of the four sets of voltages comprises the second voltage level for the first phase and the first voltage level for the second phase, wherein the third of the four sets of voltages comprises a voltage level for the first phase and a voltage level for the second phase which are the same, and the fourth of the four sets of voltages comprises a voltage level for the first phase and a voltage level for the second phase which are the same and different from the voltage level set in the third of the four sets of voltages.

7. A system according to claim 6, further comprising means for switching the setting of the four sets of voltages in the following order: the first of the four sets of voltages, the third of the four sets of voltages, the third of the four sets of voltages, the second of the four sets of voltages, the second of the four sets of voltages, the third of the four sets of voltages, the third of the four sets of voltages, and the first of the four sets of voltages.

8. A system according to claim 6, further comprising means for switching the setting of the four sets of voltages in the following order: the first of the four sets of voltages, the fourth of the four sets of voltages, the fourth of the four sets of voltages, the second of the four sets of voltages, the second of the four sets of voltages, the fourth of the four sets of voltages, the fourth of the four sets of voltages, and the first of the four sets of voltages.

9. A system for controlling a stepping motor, comprising:

a stepping motor;

drive means for driving said stepping motor, said drive means receiving an excitation phase changeover signal for changing the excitation phase of said stepping motor and to determine a drive current of said stepping motor in accordance with an input voltage input thereto;

control means, for controlling said stepping motor, having an excitation phase changeover signal generation means for driving said stepping motor by applying an excitation phase changeover signal to said drive means, wherein said control means includes level forming signal generation means for generating a plurality of level forming signals in a single driving step of said stepping motor from the time a magnetization signal is generated until a next magnetization signal is generated; and level voltage generation means for dividing a single driving step of said stepping motor into a plurality of sections in accordance with said plurality of level forming signals generated by said level forming signal generation means and for applying voltages, whose levels are determined in accordance with said plurality of sections, to said driving means as an input voltage.

10. A system according to claim 9, wherein said control means has a timer for determining the timings of the plurality of level forming signals so as to divide the duration of one step drive into the plurality of sections.

* * * * *

UNITED STATES PATENT AND TRADEMARK OFFICE
CERTIFICATE OF CORRECTION

PATENT NO. : 5,841,261

DATED : November 24, 1998

INVENTOR(S) : TAKASHI NOJIMA ET AL.

It is certified that error appears in the above-identified patent and that said Letters Patent is hereby corrected as shown below:

COLUMN 2

Line 57, "resistors the" should read --resistors for the--.
Line 65, "motor, the" should read --motor, in the--.

COLUMN 3

Line 9, "of stepping" should read --for driving a stepping--.
Line 13, "excitation" should read --excitation of--.
Line 19, "of" should be deleted.
Line 20, "stepping a" should read --a stepping--.
Line 29, "drop of" should read --drop--.

COLUMN 4

Line 46, "the all" should read --all the--.

COLUMN 5

Line 20, "function" should read --functions--.

COLUMN 6

Line 11, "The each" should read --Each--.
Line 21, "the," should read --the--.

UNITED STATES PATENT AND TRADEMARK OFFICE
CERTIFICATE OF CORRECTION

PATENT NO. : 5,841,261
DATED : November 24, 1998
INVENTOR(S) : TAKASHI NOJIMA ET AL.

It is certified that error appears in the above-identified patent and that said Letters Patent is hereby corrected as shown below:

COLUMN 7

Line 35, "as apparent" should read --as is apparent--.

COLUMN 8

Line 5, "necessary" should read --the necessary--.
Line 17, "of" should be deleted.

Signed and Sealed this

Second Day of November, 1999

Attest:

Q. TODD DICKINSON

Attesting Officer    Acting Commissioner of Patents and Trademarks